(12) United States Patent
Erta Carrera

(10) Patent No.: US 9,377,331 B2
(45) Date of Patent: Jun. 28, 2016

(54) DEVICE AND METHOD FOR MEASURING A NON-COMPRESSIBLE FLUID

(75) Inventor: Jose Erta Carrera, Sabadell (ES)

(73) Assignee: AUREP DOS, S.L., Sabadell (Barcelona) (ES)

( * ) Notice: Subject to any disclaimer, the term of this patent is extended or adjusted under 35 U.S.C. 154(b) by 402 days.

(21) Appl. No.: 13/882,950

(22) PCT Filed: Oct. 26, 2011

(86) PCT No.: PCT/ES2011/070739
§ 371 (c)(1),
(2), (4) Date: May 1, 2013

(87) PCT Pub. No.: WO2012/062944
PCT Pub. Date: May 18, 2012

(65) Prior Publication Data
US 2013/0220025 A1 Aug. 29, 2013

(30) Foreign Application Priority Data

Nov. 12, 2010 (ES) .................................. 201031675

(51) Int. Cl.
| | | |
|---|---|---|
| *G01F 25/00* | (2006.01) |
| *B67D 1/08* | (2006.01) |
| *G01F 1/05* | (2006.01) |
| *G01F 1/00* | (2006.01) |
| *G01F 15/00* | (2006.01) |
| *G01F 15/07* | (2006.01) |

(52) U.S. Cl.
CPC .. *G01F 1/05* (2013.01); *G01F 1/00* (2013.01); *G01F 15/005* (2013.01); *G01F 15/07* (2013.01)

(58) Field of Classification Search
CPC ..................... B67D 2210/0006; B67D 1/0855; G01F 25/0092; G01F 7/00; G01F 5/00; G01F 15/005; G01F 1/662; G01F 1/684
See application file for complete search history.

(56) References Cited

U.S. PATENT DOCUMENTS

| 4,073,304 A | 2/1978 | Lerner et al. |
| 7,621,192 B2 * | 11/2009 | Conti ....................... G01N 3/56 623/912 |

(Continued)

FOREIGN PATENT DOCUMENTS

| ES | 1042714 U | 9/1999 |
| JP | 59185941 A | 10/1984 |

(Continued)

OTHER PUBLICATIONS

International Search Report dated Feb. 28, 2012 in corresponding International Application No. PCT/ES2011/070739.

*Primary Examiner* — David A Rogers
(74) *Attorney, Agent, or Firm* — RatnerPrestia

(57) ABSTRACT

Device for measuring out a non-compressible fluid, characterized in that it comprises a first fluid inlet and a second fluid inlet, the two first and second liquid inlets being in liquid contact with one another, downstream of the respective inlets; a first outlet of the device and a second outlet of the device, the two first and second outlets being in fluid contact with one another upstream and downstream of the respective outlets, the first outlet having a first outlet valve giving access to the first outlet, the second outlet having a second outlet valve giving access to the second outlet, the second outlet having a flowmeter between said second outlet valve and the connection between outlets downstream thereof.

9 Claims, 3 Drawing Sheets

(56) References Cited

U.S. PATENT DOCUMENTS

| | | | |
|---|---|---|---|
| 2009/0002182 A1* | 1/2009 | Knox | B01D 46/0012 340/628 |
| 2013/0248752 A1* | 9/2013 | Sponsky | F02M 25/07 251/366 |
| 2013/0319913 A1* | 12/2013 | Ozeki | B07B 1/00 209/233 |

FOREIGN PATENT DOCUMENTS

| | | | |
|---|---|---|---|
| JP | 61-204070 | * | 9/1986 |
| WO | WO 2005/080202 A1 | | 9/2005 |

\* cited by examiner

DEVICE AND METHOD FOR MEASURING A NON-COMPRESSIBLE FLUID

CROSS-REFERENCE TO RELATED APPLICATIONS

This application is a U.S. National Stage pursuant to 35 U.S.C. §371 of International Patent Application PCT/E52011/070739, filed Oct. 26, 2011 and published as WO 2012/062944 on May 18, 2012, which claims priority to Spanish Patent Application 201031675, filed on Nov. 12, 2010, all of which are incorporated herein by reference in their entireties for all purposes.

DESCRIPTION

This invention relates to a device and method for measuring a non-compressible fluid.

More particularly this invention relates to a device and method which can be applied especially advantageously to measure a non-compressive fluid in a hydraulic circuit comprising another vehicular fluid which is also non-compressible, for example water.

This is the case for example in washing machines, in which at least one fluid and in some cases more than one, such as for example a detergent and a softener, are metered in a hydraulic circuit which carries water.

In these cases, because of the different density and rheological properties of the fluids which have to be metered it is necessary to use a flowmeter for each of the fluids so that the quantity metered can be precisely measured. Using a single flowmeter for all fluids implies the use of compensation factors related to the properties of the fluids, but given that the properties of the fluids are very variable within a characteristic range this implies high inaccuracy of measurement or the need for costly equipment to measure the properties of the fluids being metered.

This invention offers a solution to the problem stated, providing a device and method of measurement which make accurate and economical measurement possible, especially in the types of circuit mentioned above.

The invention is based on use of the fact that when an incompressible body is introduced into a container containing a first non-compressible fluid the volume of the first fluid displaced is equal to the volume of the body introduced.

From one point of view, this invention envisages the provision of a flowmeter with a by-pass located downstream from the point at which the second fluid is injected. When a second fluid is injected into the circuit ail the fluid can be made to pass through the flowmeter. In this way the flowmeter measures the quantity of the first liquid or vehicular fluid displaced by the second fluid. Because of the presence of the by-pass the second fluid cannot pass through the flowmeter.

More particularly this invention comprises a device for measuring the metering of a non-compressible fluid characterised in that it comprises:
  a first fluid inlet
  a second fluid inlet
  both the first and second inlets for fluid being in liquid contact with each other downstream of the corresponding inlets,
  a first outlet from the device,
  a second outlet from the device,
  both the first and second outlets being in fluid contact with each other upstream and downstream of the corresponding outlets,
  the first outlet having a first outlet valve providing access to the first cutlet,
  the second outlet having a second outlet valve providing access to the second out let,
  the second outlet having a flowmeter between the second outlet valve and the connection between the outlets downstream therefrom.

Preferably the device comprises a reservoir such as for example a receiving vessel to score fluid in fluid contact with the first outlet, the second outlet, the first inlet and the second inlet.

More preferably the first output has no flowmeter.

In an especially preferred embodiment the receiving vessel has a liquid outlet which bifurcates providing a passage to the first and second outlets.

In a likewise especially preferred embodiment the receiving vessel has a single inlet to the vessel into which the first and second inlets flow together.

Even more preferably she first and second outlets have corresponding first and second inlet valves to the receiving vessel.

This invention also comprises a method of measurement carried out in the device which is the subject matter of this invention.

In particular this invention also comprises a method comprising the steps of:
  providing a measurement device comprising:
    a first inlet for non-compressible fluid
    a second inlet for non-compressible fluid,
    the first and second liquid inlets being in fluid contact with each other downstream from the corresponding inlets,
    a first outlet from the device,
    a second outlet from the device,
    the first and second outlets being in fluid contact with each other upstream and downstream, of fie corresponding outlets,
    the first outlet having a first outlet valve providing access to the first outlet,
    the second outlet having a second outlet valve providing access to the second outlet.,
    the second outlet having a flowmeter between the second outlet valve and the connection between the outlets downstream thereof;
  filling the device with a first fluid or vehicular fluid;
  closing the first outlet valve, thus preventing the first fluid from entering the first outlet;
  introducing through the second outlet, by injection or aspiration, a second fluid which has to be metered;
  using the flowmeter to measure the vehicular fluid displaced by the entry of the second fluid.

Preferably the method has a storage facility in the device to increase the measurement capacity of the system.

Preferably, when the second fluid is introduced the second outlet valve is closed and the first outlet valve is opened so that the second fluid circulates without passing through the flowmeter.

For a better understanding of the invention a number of drawings of an embodiment of this invention are provided by way of explanation but without restriction.

Figure 1:
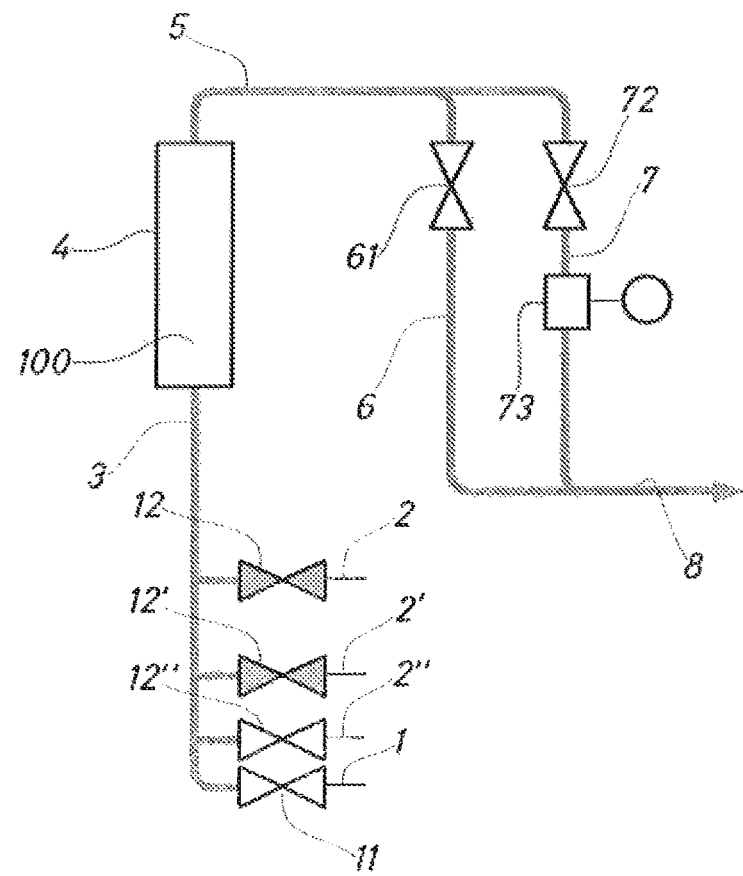
FIG. 1 shows a diagram of a measuring device according to this invention in the resting state (without flow or with a flow of vehicular fluid).

An embodiment of a measuring device according to this invention in a hydraulic circuit which may possibly be applied in a washing machine can be seen in FIG. 1.

The device in FIG. 1 comprises a first inlet -1- for vehicular fluid, such as water, an inlet -2- for a second fluid, such as fox example a detergent solution, and other inlets -2'-, -2"- for other fluids (for example softeners). Each inlet has its own inlet valve -11-, -12-, -12'-, 12"- to open/shut off passage of the corresponding non-compressible fluid.

Each of the inlets has a pipe -3- which in turn provides entry to a receiving vessel -4- which is assumed to be a storage vessel for fluid.

In this example the receiving vessel has an outlet pipe -5- which leads to a bifurcation. At the first bifurcation or outlet -6- there is a first outlet valve -61-, while at the second bifurcation or outlet there is a second outlet valve -72-. A flowmeter -73- is located downstream from second outlet valve -72-. Both bifurcations -6-, -7- flow together into the same pipe -8- feeding the hydraulic circuit. Although not shown in the figures, one or two non-return valves may be placed in each of bifurcations -6-, -7- close to pipe -8- feeding the hydraulic circuit.

FIG. 1 shows the circuit in a resting condition. In this state the circuit is full of vehicular liquid -100-, and there is no flow. There may also be a flow of vehicular fluid -100-, such as for example water.

Figure 2:
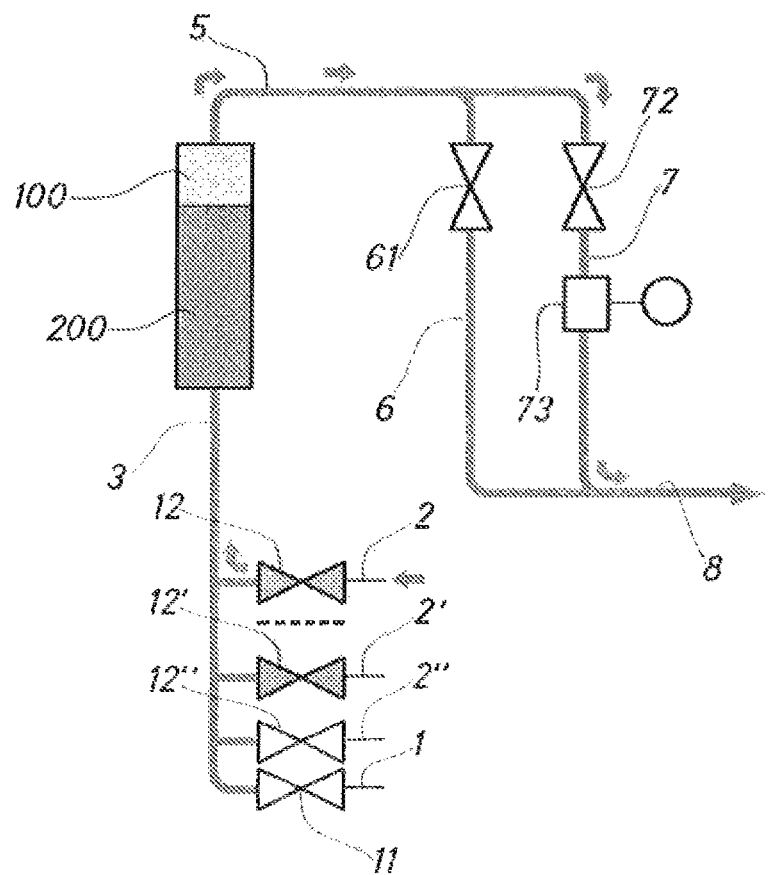
FIG. 2 shows the diagram in FIG. 1 as the second liquid is injected and while the injected flow is being measured.

In the active condition, the product or products, that is to say the second and third non-compressible fluids, are introduced into the circuit in sequence, downstream from receiving vessel -4-, as illustrated in FIG. 2. For proper functioning the volume of the receiving vessel will determine the maximum volume of second liquid -200- which has to be metered. In this condition, first outlet valve -61- is closed and second outlet valve -72- is open. If the compressibility of vehicular fluid -100- is negligible, the volume of second liquid -200- introduced which has to be measured is equal to the volume of vehicular fluid -100- displaced. Given the locations of the outlet valves all the displaced vehicular fluid -100- passes through flowmeter -73- and therefore the quantity measured by flowmeter -73 -corresponds to the volume of second liquid -200 -introduced through second inlet valve -12-.

The second fluid may be added either by injection through second inlet -2- or by aspiration for example through pipe -8- feeding the hydraulic circuit, with the second inlet valve -12- open and the other inlet valves -11-, -12'-, -12"- closed.

Figure 3:
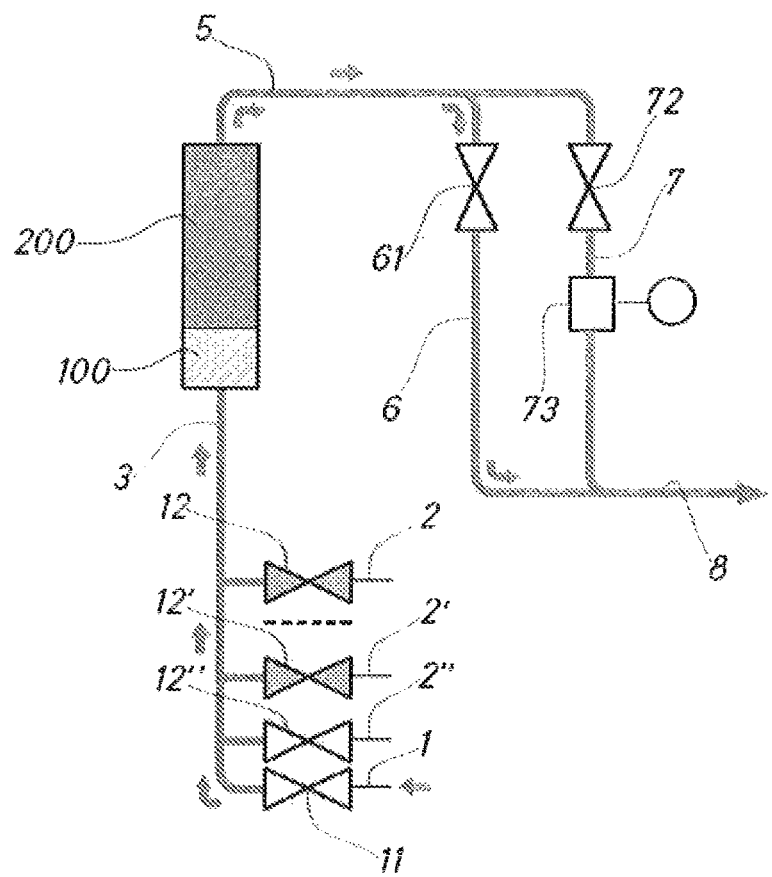
FIG. 3 shows a diagram of the measurement device once measurement is complete, with the second fluid circulating through the hydraulic circuit.

Finally, and as will be seen in FIG. 3, the resulting mixture is carried to consumption points in the hydraulic circuit. For the purposes of flushing second inlet valve -12- can be closed, first valve -11- can be opened and more vehicular fluid -100- can be introduced into the circuit.

The embodiment illustrated offers as advantages, among others, the use of a metering device and measurement which are independent of the properties of the fluid being measured (for example density and rheology), as the result of which less error and greater accuracy of measurement is obtained without the need to use compensation factors in order to calculate this.

Although the invention has been described in relation to preferred embodiments, these must not be regarded as restricting the invention, which is defined by the broadest interpretation of the following claims.

The invention claimed is:

1. A measuring device for metering a non-compressible fluid, comprising:
    (a) a first fluid inlet,
    (b) a second fluid inlet,
    (c) a first outlet from the device,
    (d) a second outlet from the device, and
    (e) a reservoir to store fluid in fluid contact with the first outlet, the second outlet, the first inlet and the second inlet,
    wherein both the first and second inlets for fluid being in liquid contact with each other downstream of the corresponding inlets,
    wherein both the first and second outlets being in fluid contact with each other upstream and downstream of the corresponding outlets,
    wherein the first outlet having a first outlet valve providing access to the first outlet,
    wherein the second outlet having a second outlet valve providing access to the second outlet, and
    wherein the second outlet having a flowmeter between the second outlet valve and the connection between the outlets downstream therefrom.

2. The device according to claim 1, wherein of the two outlets mentioned, only the second outlet has a flowmeter.

3. The device according to claim 1, wherein the reservoir has a liquid outlet which bifurcates providing a passage to the first and second outlets.

4. The device according to claim 1, wherein the reservoir has a single inlet to the vessel into which the first and second inlets flow.

5. The device according to claim 1, wherein the first and second outlets have corresponding first and second inlet valves to the reservoir.

6. The device according to claim 1, wherein the reservoir is a receiving vessel.

7. A method for measuring a non-compressible fluid, comprising:
    (a) providing the measurement device of claim 1;
    (b) filling the device with a first fluid or vehicular fluid;
    (c) closing the first outlet valve, thus preventing the first fluid from entering the first outlet;
    (d) introducing through the second outlet, by injection or aspiration, a second fluid which has to be metered; and
    (e) using the flowmeter to measure the vehicular fluid displaced by the entry of the second fluid.

8. The method according to claim 7, wherein a storage vessel is provided in the device to increase the measurement capacity of the system.

9. The method according to claim 7, wherein when the second fluid is introduced the second outlet valve is closed and the first outlet valve is opened in such a way that the second fluid circulates without passing through the flowmeter.

* * * * *